United States Patent [19]

Franchino

[11] Patent Number: 4,694,273

[45] Date of Patent: Sep. 15, 1987

[54] DEVICE FOR INDICATING ABNORMAL PRESSURE CONDITIONS IN A TIRE ON A MOTOR VEHICLE IN MOTION

[76] Inventor: Domenico Franchino, Via Chisola 19/A, Cumiano (Turin), Italy

[21] Appl. No.: 790,827

[22] Filed: Oct. 24, 1985

[30] Foreign Application Priority Data

Nov. 5, 1984 [IT] Italy .................. 68098 A/84

[51] Int. Cl.$^4$ ............................. B60C 23/02
[52] U.S. Cl. .................. 340/58; 200/61.25; 200/83 J; 73/146.8; 73/745
[58] Field of Search ............ 340/58, 626; 200/61.25, 200/83 J; 73/146.3, 146.4, 146.5, 146.8, 745

[56] References Cited

U.S. PATENT DOCUMENTS

| | | | |
|---|---|---|---|
| 3,430,196 | 2/1969 | Dalton | 340/58 |
| 3,588,815 | 6/1971 | Koonce | 340/58 |
| 3,693,149 | 9/1972 | Johnston | 340/58 |
| 4,075,603 | 2/1978 | Snyder et al. | 340/58 |
| 4,090,172 | 5/1978 | Vesnic | 340/58 |
| 4,255,630 | 3/1981 | Hire et al. | 340/626 X |
| 4,335,283 | 6/1982 | Migrin | 73/146.8 X |

Primary Examiner—James L. Rowland
Assistant Examiner—Brian R. Tumm
Attorney, Agent, or Firm—McGlew and Tuttle

[57] ABSTRACT

The device is applied to the wheel of a motor vehicle and includes a component that is sensitive to the pressure inside the tire and has a conductive, sliding element. When this element reaches the extreme limits of its travel it closes an electrical contact and activates a radio transmitter whose signals, picked up by a receiver located in the passenger compartment, activate a visual and/or acoustic alarm.

9 Claims, 4 Drawing Figures

DEVICE FOR INDICATING ABNORMAL PRESSURE CONDITIONS IN A TIRE ON A MOTOR VEHICLE IN MOTION

FIELD OF THE INVENTION

This invention concerns a device capable of indicating abnormal pressure conditions in tires on a motor vehicle in motion.

BACKGROUND OF THE INVENTION

It is common knowledge how important it is to check the tire pressure on a motor vehicle. Too high a pressure can in fact cause the tire to burst with disastrous consequences for the passengers and persons in the vicinity of the vehicle. If the pressure is too low it will not only accelerate tire wear but also rapidly raise the temperature and consequently increase the pressure which can cause the tire to burst. Despite the fact that it is of such great importance, the pressure is measured all too infrequently since the vehicle must remain stationary for a certain period of time to allow the tyre to cool down. Various devices have been proposed for monitoring tyre pressure during motion which normally include a pressure sensitive element that activates, when the tire pressure becomes abnormal or dangerous, a transmitter whose signals are picked up by a receiver located in the passenger compartment.

These devices, however, are difficult or complicated to produce since they need to be of a reduced size to be fitted to the wheels of any type of vehicle, or else they present sealing problems inside the sensor.

SUMMARY OF THE INVENTION

These problems have been overcome by the invention that is characterized by the fact that the sensor consists of a case with an axial cavity, divided into two parts; the first of these parts houses a movable element that is permanently in contact with one of the transmitter's terminals, and is closed by an adjustable ring nut that establishes one of the travel limits of the movable element. The other part is divided into two chambers, (the first communicating with the first part and the second chamber communicating with the inside of the tire) by means of a flexible membrane with edges held with a seal ring between a bush made of conductive material, that defines the travel limit of the movable element, and a second ring nut screwed into a fixed positon in the cavity in the case. Both the bush and the second ring nut have axial cavities that house a first and a second piston respectively; the first piston is held between the membrane and the movable element, and the second piston rests one end against the membrane and has the other end free and exposed to the tire pressure. These pistons keep the movable element half way between the two limit positions as long as the pressure remains within a range of values that has been defined normal.

This invention features another advantage in that it includes a receiver located in the passenger compartment which can be connected to a tachograph and/or an on-board computer to permit permanent storage of the defect indications.

BRIEF DESCRIPTION OF THE DRAWINGS

For further details reference is made to the attached drawings in which.

DETAILED DESCRIPTION OF THE PREFERRED EMBODIMENT

Figure 1:
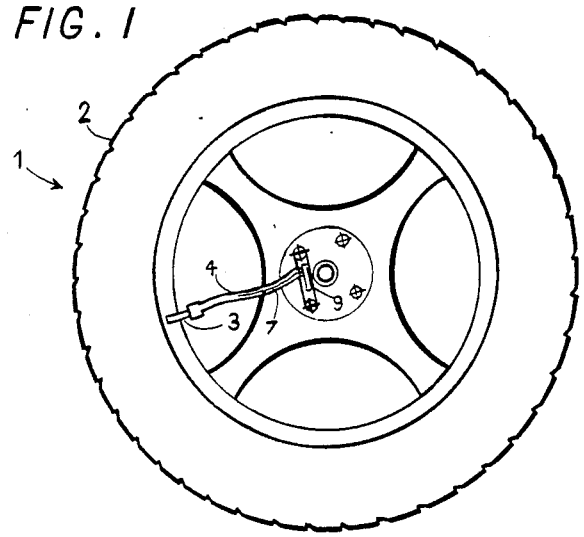
FIG. 1 illustrates the device fitted to a wheel.
Figure 2:
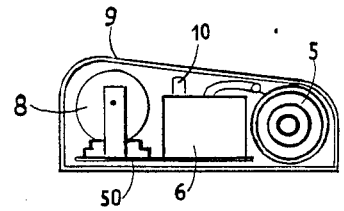
FIG. 2 is an enlarged view of a detail.

With reference to FIGS. 1 and 2, it can be seen that the inflation valve 3 of tire 2 on a motor vehicle wheel 1 is connected to a pressure sensor 5 situated in a container 9 possibly secured to wheel 1 with a bracket.

Sensor 5 is inserted to act as a switch in the circuit of a radio transmitter 6, activated by the sensor when the tire pressure leaves a pre-established range of values. The transmitter components are mounted on a conventional printed circuit board 50 positioned inside the container with the supply battery 8 and a led 10 which is active when the transmitter is in operation.

The signals emitted by the transmitter are sent via an antenna 7, inside tube 4, to a receiving antenna possible located on the vehicle's cab, and then onto a receiver that activates a visual and/or acoustic alarm and sends a signal to the tachograph and on-board computer, if present.

Figure 3:
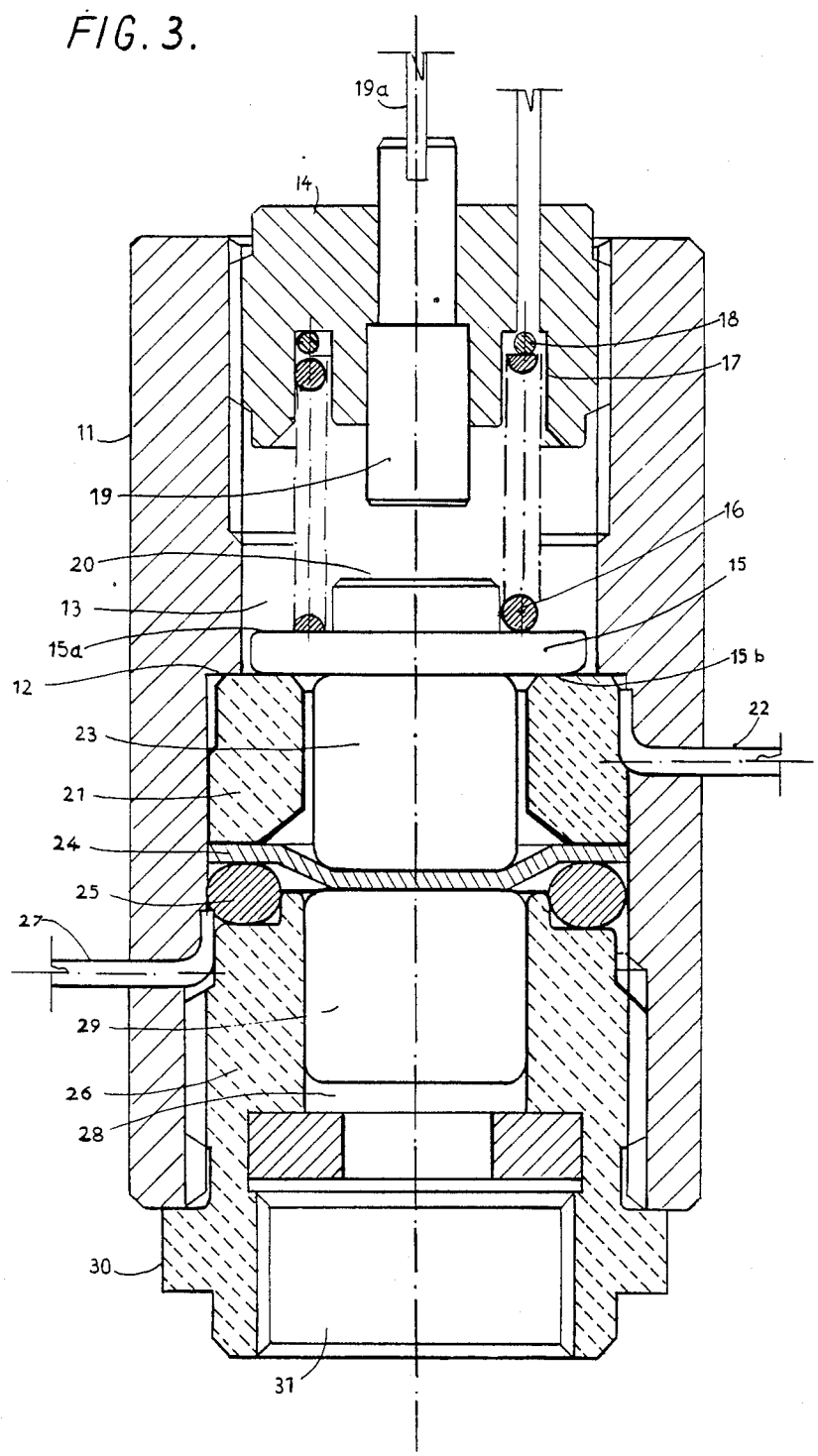
FIG. 3 is a cross-section view of the pressure sensor.

FIG. 3 shows that sensor 5 consists of a hollow body 11 that is basically cylindrical without ends, whose inner surface has a step 12 that divides the axial cavity into two parts with different diameter. The part with the narrowest diameter 13 is closed by an adjustment ring nut 14 that is adjustably screwed on body 11.

In this part a disk 15 made of conductive material slides against the action of a spring 16 calibrated in relation to the normal pressure used. One end of this spring rests on side 15a of disk 15 and the other fits in a circular groove 17 in the inner side of ring nut 14.

This groove is also the terminating point of a conductor 18 which is connected to the transmitter, and is in permanent contact with disk 15 via spring 16.

The ring nut also bears a connecting plug 19 that enters cavity 13 and is connected to a conductor 19a connected to the transmitter. The plug is intended to work in conjunction with a central piece 20 protruding from side 15a of the sliding disk 15.

The other part of the cavity inside body 11 houses the low pressure contact that closes the transmitter circuit, and the compoents that move disk 15 against the action of spring 16.

To be more precise, a bush 21 made of conductive material rests on step 12 and blocks a second conductor 22 connected to the transmitter, against the inner surface of body 11; this bush also has an axial cavity that houses a piston 23. One end of this piston rests on the other side, 15b, of disk 15, and the other end touches one side of a flexible membrane 24 inserted without backlash in the cavity in body 11. The edges of this membrane are pressed against bush 21 by a gasket 25 that has been fitted around the end part of a ring nut 26 (screwed into a fixed position at the end of the cavity in body 11) so that it seals against the walls of body 11.

This ring nut is also made of conductive material and blocks the end of a conductor 27 of the transmitter antenna circuit against the inner wall of body 11. Ring nut 26 has an axial cavity 28 that communicates with tube 4 and houses a piston 29, the same as piston 23, one end of which rests against membrane 24 while the other end is free and consequently exposed to the pressure conditions in the tire.

One end, 30, of the ring nut juts out of the cavity in body 11, and can be connected to tube 4. This part of the ring nut 30 has a seat 31 for a plug (not illustrated) used during storage to press on piston 29 and keep disk 15 half way between the two contacts, thereby preventing battery discharge. Ring nut 26 establishes electrical continuity between conductor 27 and the antenna wire 7 inside tube 4.

Correct functioning of the sensor illustrated in FIG. 3 can be easily seen from the following: for a given optimal inflation pressure, ring nut 14 in body 11 should be screwed in until disk 15 under the opposing pressure of spring 16 and pistons 23, 29 assumes a balanced position in which both its faces are more or less equidistant from bush 21 and plug 19.

While the pressure remains within a pre-established range of values, the transmitter circuit remains open, since any movement of disk 15 towards plug 19 or towards bush 21 is not sufficient to bring it into contact with these parts.

If the pressure increases excessively, pistons 23, 29 will bring the central protruding part of disk 15 into contact with plug 19 whereupon the transmitter circuit is closed between wires 19a and 18 via plug 19, disk 15 and spring 16.

If the pressure decreases excessively, spring 16 will push disk 15 against bush 21, closing the transmitter circuit between wires 18 and 22 via spring 16 disk 15 and bush 21.

The drawing clearly shows the simplicity of the sensor's construction despite the reduced dimensions it must have. In addition, the presence of gasket 25 guarantees a perfect seal in cavity 28 despite the hole for wire 27, thus ensuring piston effectiveness.

Figure 4:
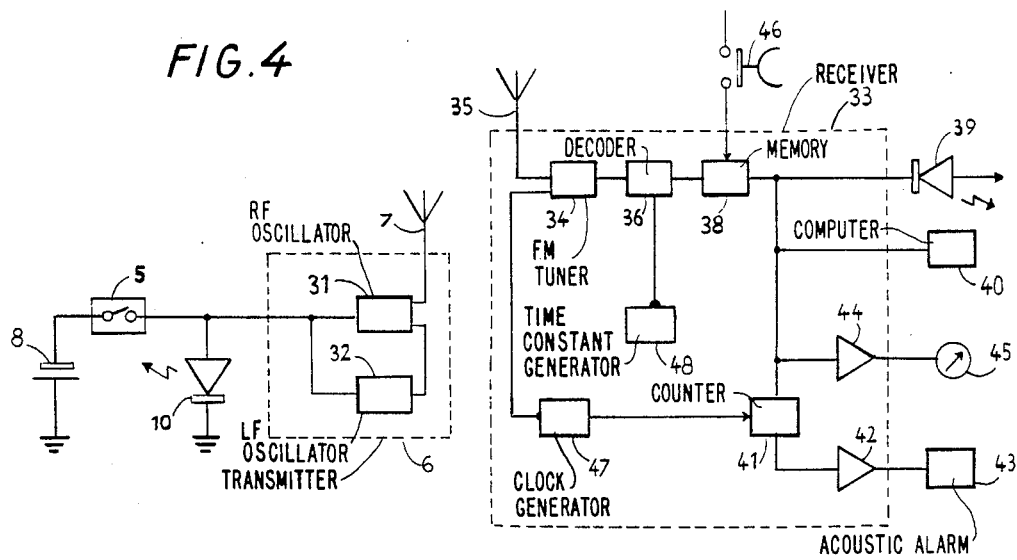
FIG. 4 is a block diagram of the device's electronics.

FIG. 4 illustrates a block diagram of the device electronics.

The parts that have already been described are indicated with the same numbers as those used in the previous figures.

Sensor 5 is represented as a switch.

Transmitter 6 is a conventional frequency modulation transmitter with a radio frequency oscillator 31 connected to antenna 7, controller by the low frequency oscillator 32 that generates the modulation frequency.

Receiver 33 contains a frequency modulation tuner 34 connected to antenna 35 with a periodically variable tuning research around a central value which corresponds to the nominal carrier frequency generated by the transmission oscillator 31.

If a carrier modulated to the nominal frequency is present in the turning band, tuner 34 emits a signal that is the modulation frequency of the received signal on a low frequency output.

This output is connected to a decoder 36 that compares the tuner output signal with the signal generated by a time constant 48. If the two signals (frequence is) are equal, it emits a logic signal that is stored in a memory device 38 (for instance a bistable) whose output is connected to:
 a luminous indicator e.g. LED 39,
 an on-board computer 40, if present,
 a counter 41 that activates an acoustic indicator 43, via a driving circuit 41, until it has counted a pre-established number of clock signals emitted from a generator 47 enabled by the tuner 34, and
 a recording device 45 of the kind known as a "tachograph" through the conventional driving circuitry 44 of such device.

A manual reset pushbutton 46 resets the bistable and deactivates alarm 39 once the driver has identified the defective tire. To do this the driver simply needs to stop the vehicle and inspect the wheels until he finds the one where the warning light 10 is lit. Obviously if the cause of the alarm is not eliminated, tuner 34 reactivates the indicators, tachograph and computer as soon as it recognizes the transmitter frequency in the next "sweep". To simplify matters, the converter that uses the vehicle's battery voltage to power the receiver circuitry and the associated connections are not illustrated

We claim:

1. Device for indicating abnormal pressure conditions in a tire on a motor vehicle in motion, consisting of: a pressure sensor having a movable element and opposing spring which closes a transmitter circuit when it reaches one of two limit positions correspolnding to an upper and lower limit in a range of normal pressure values, and a receiver that picks up the transmitter signals and activates a visual and/or acoustic alarm, characterized in that the aforesaid sensor is composed of a substantially cylindrical case with its internal cavity divided into two parts, the first of which houses the movable element, in permanent electrical contact with one of the transmitter's terminals, and is closed by a first adjustable ring nut that determines one of the limit positions, while the other part is divided into two chambers, that communicate with the first part and the inside of the tire respectively, by means of a flexible membrane whose edges are held with a seal ring between a bush made of conductive material, that determines the second limit position, and a second ring nut screwed into a fixed position in the cavity in the case; in that both the bush and the second ring nut have axial cavities that house a first and a second piston, of which the first piston is held between the membrane and the movable element, and the second piston rests one end against the membrane and has the other end free and exposed to the tire pressure, these pistons keeping the movable element half way between the two limit positions as long as the pressure remains within a range of values that has been defined normal; and in that the aforesaid receiver has logic outputs for connection with a tachograph and/or on-board computer.

2. Device according to claim 1, characterized in that the aforesaid bush is permanently connected electrically to a conductor for connection to the transmitter for closing the transmitter circuit in the second of the aforesaid limit positions.

3. Device according to claim 1, characterized in that the aforesaid first ring nut has a circular groove in its inner surface which houses the end of a conductor for connection to the transmitter, and one end of the opposing spring that establishes the permanent electrical contact between the conductor and the movable element.

4. Device according to claim 3, characterized in that the aforesaid ring nut has a plug protruding into the sensor case cavity, connected to a second conductor for connection to the transmitter and intended to come into contact with a protruding part of the movable element so as to close the transmitter circuit in the first limit position.

5. Device according to claim 1, characterized in that the transmitter and the sensor are placed in a common container fixed to the wheel, and the sensor's internal cavity communicates with the inside of the tire by means of a flexible tube fixed on one side to the aforesaid second ring nut and on the other side to the tire's inflation valve.

6. Device according to claim 2, characterized in that the transmitter has an antenna consisting of a wire placed inside the aforesaid tube and connected, via the second ring nut, to a transmitter antenna wire.

7. Device according to claim 1, characterized in that the transmitter and the receiver operate in frequency modulation, and in that the receiver includes equipment that is capable of recognizing whether the modulation frequency of a received signal is the modulation frequency used in the transmitter, and that if so, generates logic signals which activate the alarm devices and which cause the alarm to be recorded by at tachograph and/or stored by an on-board computer.

8. Device according to claim 7, characterized in that the recognizing equipment is connected to a memory device that maintains the logic signals until a manual reset device is operated to reset the receiver.

9. A device for indicating a pressure condition in a tire of a motor vehicle in motion, which pressure condition is outside of a normal range between an upper and a lower limit, comprising a transmitter having first, second and third conductors connected thereto, said transmitter being activatable to transmit a signal when said first conductor is electrically connected to one of said second and third conductors, a receiver for receiving the signal from said transmitter, alarm means connected to said receiver for producing an alarm when said receiver receives the signal from said transmitter, and a pressure sensor connected to said first, second and third conductors and operatively connected to receive pressure from the tire, said pressure sensor operating to electrically connect said first conductor with said second conductor when the tire pressure rises above the upper limit, and to electrically connect the first conductor to the third conductor when the pressure falls below the lower limit, said pressure sensor comprising a hollow body having an internal cavity and including opposite open ends, a first ring nut adjustable connected into one of said opposite open ends and carrying said first conductor, an electrically conductive hollow bush fixed to said hollow body and disposed in said internal cavity, said second conductor being electrically connected to said bush, said bush being spaced away from said first ring nut and defining a first cavity portion of said internal cavity, an electrically conductive movable element movably mounted in said first cavity portion between said bush and said first ring nut, said movable element being engageable against said bush for establishing electrical connection with said second conductor and being engageable against said first conductor for establishing electrical connection therewith when said movable element is in a position adjacent said first ring nut, a spring engaged against said movable element for biasing said movable element against said bush, said third conductor being electrically connected to said spring for establishing electrical connection wth said movable element, a first piston movable mounted in said bush for movement against said movable element to move said movable element away from said bush, a second ring nut connected in said opposite open end of said hollow body, said second ring nut having an axial cavity therein for communicating with the tire pressure, a second piston movably mounted in said axial cavity, said second piston having a first side for communication with the tire pressure and an opposite side, a flexible membrane fixed in said hollow body for separating said axial cavity from an interior space of said bush and from said first cavity portion, a gasket engaged between said second ring nut and said flexible membrane for sealing said flexible membrane to said hollow body, said opposite end of said second piston being engaged against said flexible membrane and said first piston being engaged against said flexible membrane whereby the tire pressure acting upon said second piston is capable of moving said second piston to move said first piston through said flexible membrane to move said movable element, said first ring nut being adjusted to a location with respect to said hollow body whereby the tire pressure between the upper and lower limits moves said second piston into a position to hold said second movable element in an intermediate location between said bush and said first ring nut, whereby a change of the tire pressure above said upper limit causes said movable element to be moved into electrical contact with said first conductor, and a change of the tire pressure below said lower limit causes said movable element to be engaged with said bush.

* * * * *

UNITED STATES PATENT AND TRADEMARK OFFICE
CERTIFICATE OF CORRECTION

PATENT NO. : 4,694,273

DATED : September 15, 1987

INVENTOR(S) : Domenico Franchino et al.

It is certified that error appears in the above-identified patent and that said Letters Patent is hereby corrected as shown below:

On the title page, Item [76] add the three inventors:

Ettore Pantet
        Corso Peschiera 142/1
        Turin, Italy

Luigi Libre
        Corso Matteotti 55
        Turin, Italy

Gaspare Valperga
        Via Forli 78
        Turin, Italy

Signed and Sealed this

Fifth Day of January, 1988

*Attest:*

DONALD J. QUIGG

*Attesting Officer*     *Commissioner of Patents and Trademarks*